(12) United States Patent
Vogel et al.

(10) Patent No.: US 8,881,916 B2
(45) Date of Patent: *Nov. 11, 2014

(54) VERTICAL CABLE MANAGER

(75) Inventors: Mark A. Vogel, Hinsdale, IL (US); Michael J. McGrath, New Lenox, IL (US)

(73) Assignee: Panduit Corp., Tinley Park, IL (US)

(*) Notice: Subject to any disclaimer, the term of this patent is extended or adjusted under 35 U.S.C. 154(b) by 422 days.

This patent is subject to a terminal disclaimer.

(21) Appl. No.: 12/814,900

(22) Filed: Jun. 14, 2010

(65) Prior Publication Data

US 2010/0252701 A1    Oct. 7, 2010

Related U.S. Application Data

(63) Continuation of application No. 11/123,369, filed on May 6, 2005, now Pat. No. 7,762,405.

(60) Provisional application No. 60/569,185, filed on May 7, 2004.

(51) Int. Cl.
| | |
|---|---|
| *A47F 7/04* | (2006.01) |
| *H02B 1/20* | (2006.01) |
| *H04Q 1/06* | (2006.01) |
| *H04Q 1/02* | (2006.01) |

(52) U.S. Cl.
CPC .............. *H04Q 1/062* (2013.01); *H04Q 1/068* (2013.01); *H04Q 1/066* (2013.01); *H04Q 1/13* (2013.01); *H04Q 2201/02* (2013.01)
USPC ............................................ 211/26; 361/826

(58) Field of Classification Search
USPC ................... 16/262, 263; 211/26; 248/213.1; 292/121
See application file for complete search history.

(56) References Cited

U.S. PATENT DOCUMENTS

| 1,771,184 | A | * | 7/1930 | McLaughlin | ..................... 16/85 |
|---|---|---|---|---|---|
| 2,535,275 | A | | 12/1950 | Dixon | |
| 3,777,098 | A | | 12/1973 | Tapper | |
| 4,818,000 | A | | 4/1989 | Bobrowski | |

(Continued)

OTHER PUBLICATIONS

Panduit Network Connectivity Group Catalog, front cover, pp. 66-68 and rear cover, Jul. 2003.

(Continued)

*Primary Examiner* — Katherine Mitchell
*Assistant Examiner* — Jeremy Ramsey
(74) *Attorney, Agent, or Firm* — Christopher S. Clancy; James H. Williams

(57) ABSTRACT

A cable manager is disclosed. The cable manager includes a backbone, a plurality of finger sections connected to the backbone to form a vertical cable channel, and a first pair of horizontal rails connected to the top end of the backbone and a second pair of horizontal rails connected to the bottom end of the backbone. The cable manager also includes a first cross brace connected to the first pair of horizontal rails and a second cross brace connected to the second pair of horizontal rails, and a door hingedly connected to the first and second cross braces. Each cross brace includes a mounting surface having a plurality of guide surfaces and an alignment aid protruding from the mounting surface and extending beyond a horizontal axis extending between the guide surfaces. The door includes a pair of latches connected to a hinge pin through a pair of windows, and a spring connected to the hinge pin and the pair of latches.

6 Claims, 19 Drawing Sheets

(56) References Cited

U.S. PATENT DOCUMENTS

| | | | |
|---|---|---|---|
| 5,640,482 A | 6/1997 | Barry et al. | |
| 5,715,348 A | 2/1998 | Falkenberg et al. | |
| 5,902,961 A | 5/1999 | Viklund et al. | |
| 5,926,916 A * | 7/1999 | Lee et al. | 16/230 |
| 6,065,612 A * | 5/2000 | Rinderer | 211/26 |
| 6,102,214 A | 8/2000 | Mendoza | |
| 6,142,595 A | 11/2000 | Dellapi et al. | |
| 6,245,998 B1 | 6/2001 | Curry et al. | |
| 6,365,834 B1 | 4/2002 | Larsen et al. | |
| D463,253 S | 9/2002 | Canty | |
| 6,468,112 B1 | 10/2002 | Follingstad et al. | |
| 6,489,565 B1 | 12/2002 | Krietzman et al. | |
| 6,501,899 B1 | 12/2002 | Marrs et al. | |
| 6,541,705 B1 | 4/2003 | McGrath | |
| 6,584,267 B1 | 6/2003 | Caveney et al. | |
| 6,614,978 B1 | 9/2003 | Caveney | |
| 6,766,093 B2 | 7/2004 | McGrath et al. | |
| 6,814,244 B1 * | 11/2004 | Hathcock | 211/26 |
| 7,108,135 B2 | 9/2006 | Park | |
| 7,119,282 B2 | 10/2006 | Krietzman et al. | |
| 2001/0031124 A1 | 10/2001 | McGrath et al. | |
| 2005/0210828 A1 * | 9/2005 | Mower et al. | 52/782.22 |

OTHER PUBLICATIONS www.panduit.com/products/PatchRunner_Roadmap.pdf; one page, Mar. 28, 2003.

\* cited by examiner

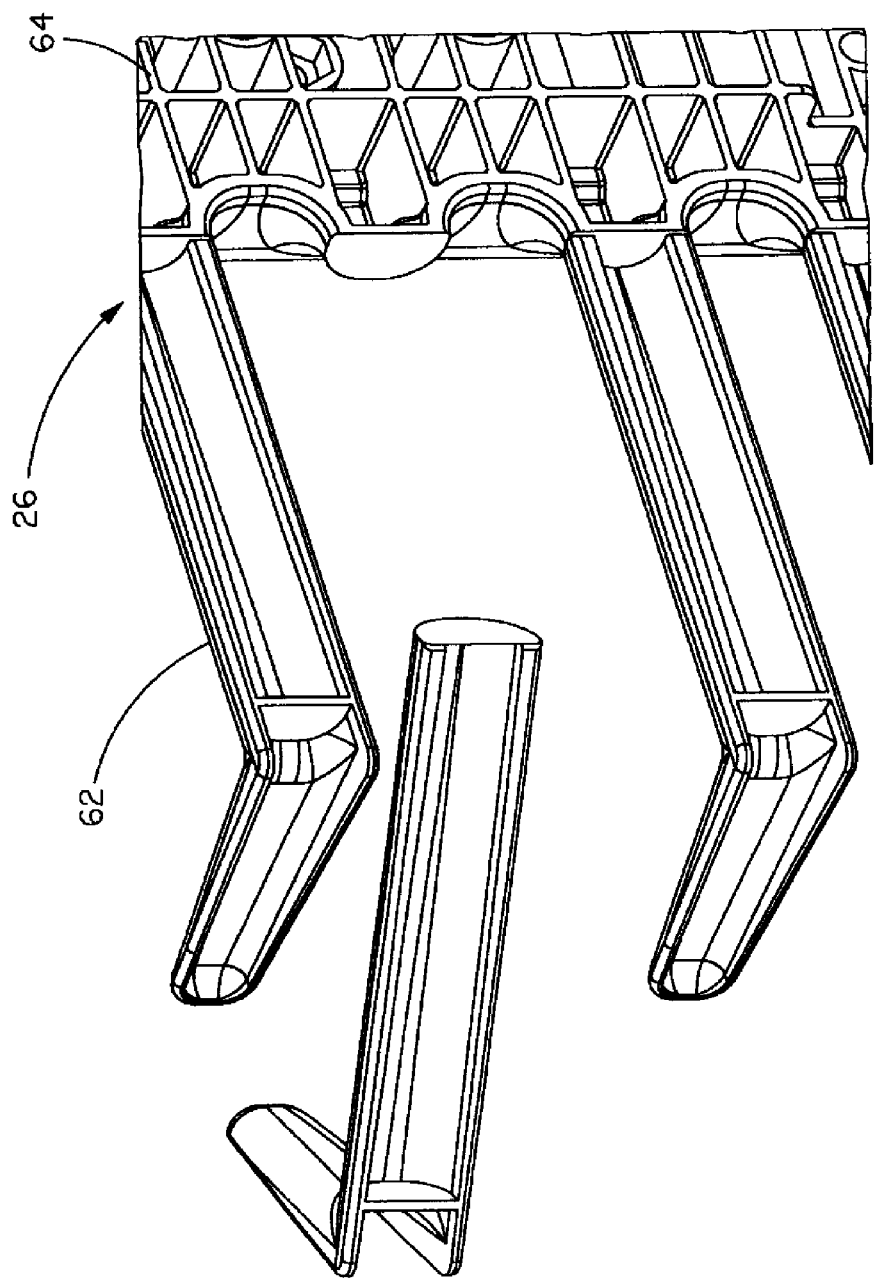

VERTICAL CABLE MANAGER

CROSS-REFERENCE TO RELATED APPLICATIONS

This application is a continuation of U.S. patent application Ser. No. 11/123,369, filed May 6, 2005, and claims priority to U.S. Provisional Patent Application No. 60/569,185, filed May 7, 2004, each of which is incorporated by reference in its entirety.

BACKGROUND OF THE INVENTION

The present invention is directed to a cable management device and, more particularly, a vertical cable manager having a dual hinging door for managing cable on the front and/or the rear of any EIA network equipment rack.

Vertical cable managers for use in cable management systems are well known in the art. Moreover, vertical cable managers having dual hinging doors are also known. However, none of the prior art references disclose a vertical cable manager with a dual hinging door having a spring-loaded, center release door latch mechanism and a door alignment or closure aid.

SUMMARY OF THE INVENTION

It would be desirable to provide a vertical cable manager having a spring-loaded, center release door latch mechanism and a door alignment or closure aid.

It would also be desirable to provide a vertical cable manager having removable fingers to create horizontal pathways into a vertical cable channel.

A cable manager is disclosed. The cable manager includes a backbone, a plurality of finger sections connected to the backbone to form a vertical cable channel, and a first pair of horizontal rails connected to the top end of the backbone and a second pair of horizontal rails connected to the bottom end of the backbone. The cable manager also includes a first cross brace connected to the first pair of horizontal rails and a second cross brace connected to the second pair of horizontal rails, and a door hingedly connected to the first and second cross braces. Each cross brace includes a mounting surface having a plurality of guide surfaces and an alignment aid protruding from the mounting surface and extending beyond a horizontal axis extending between the guide surfaces. The door includes a pair of latches connected to a hinge pin through a pair of windows, and a spring connected to the hinge pin and the pair of latches.

Preferably, the cable manager includes a third cross brace connected to the first pair of horizontal rails and a fourth cross brace connected to the second pair of horizontal rails. A second door is hingedly connected to the third and fourth cross braces.

Preferably, each cross brace includes a mounting surface having a plurality of apertures that receive a hinge pin when the door is in a closed position. The hinge pins are removed from the mounting surface apertures upon actuation of a pair of latches.

Preferably, four finger sections are connected to each side of the backbone to form a front vertical cable channel. Similarly, four finger sections are connected to each side of the backbone to form a rear vertical cable channel. Moreover, each finger section includes eleven fingers connected to a base, and each finger can be removed from the base to provide a horizontal pathway into the front or rear vertical cable channel.

Preferably, the door includes a first pair of latches connected to a first hinge pin through a first pair of windows, and a second pair of latches connected to a second hinge pin through a second pair of windows. Moreover, the door includes a first spring connected to the first hinge pin and the first pair of latches, and a second spring connected to the second hinge pin and the second pair of latches.

Preferably, the first pair of latches and the second pair of latches are vertically positioned near a longitudinal midpoint of the door.

BRIEF DESCRIPTION OF FIGURES

FIG. 19B is an enlarged view of a portion of the finger section of FIG. 18, showing a finger removed from the finger section.

DETAILED DESCRIPTION OF PREFERRED EMBODIMENTS

The illustrated embodiments of the invention are directed to a vertical cable manager. Vertical cable manager 20 may be used to manage cable (not shown) on the front and/or the rear of any EIA network equipment rack, such as rack 21. Rack 21 may include a patch panel such as angled patch panel 23 or other active equipment such as a switch. Although FIGS. 1-19B illustrate vertical cable manager 20 used to manage cable on the front and the rear of rack 21, it is likewise contemplated that vertical cable manager 20 may be used to manage cable only on the front of rack 21.

Figure 1:
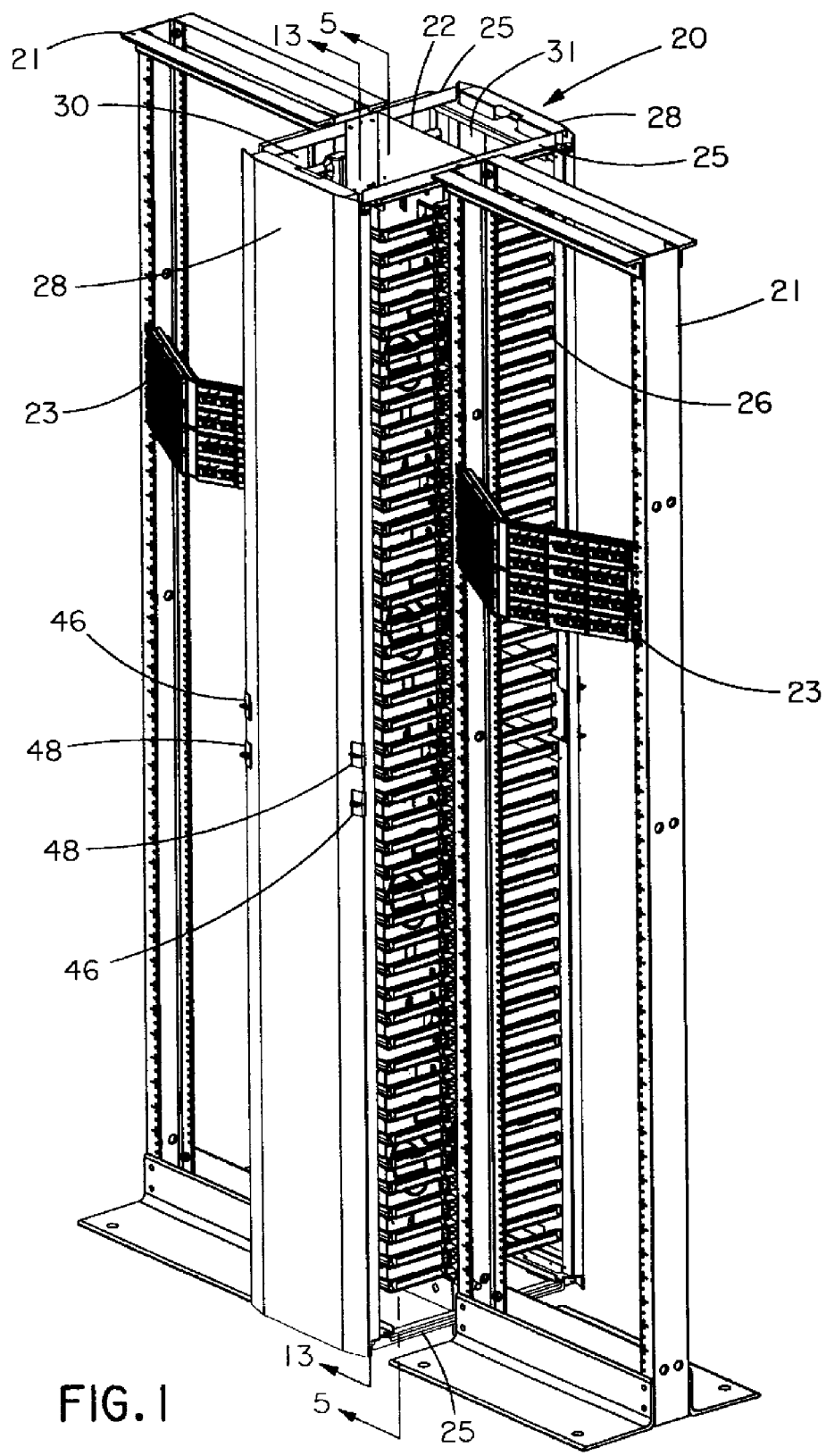
FIG. 1 is a front right perspective view of a vertical cable manager positioned between two telecommunications racks according to the present invention, showing a hinged door in the closed position.
Figure 2:
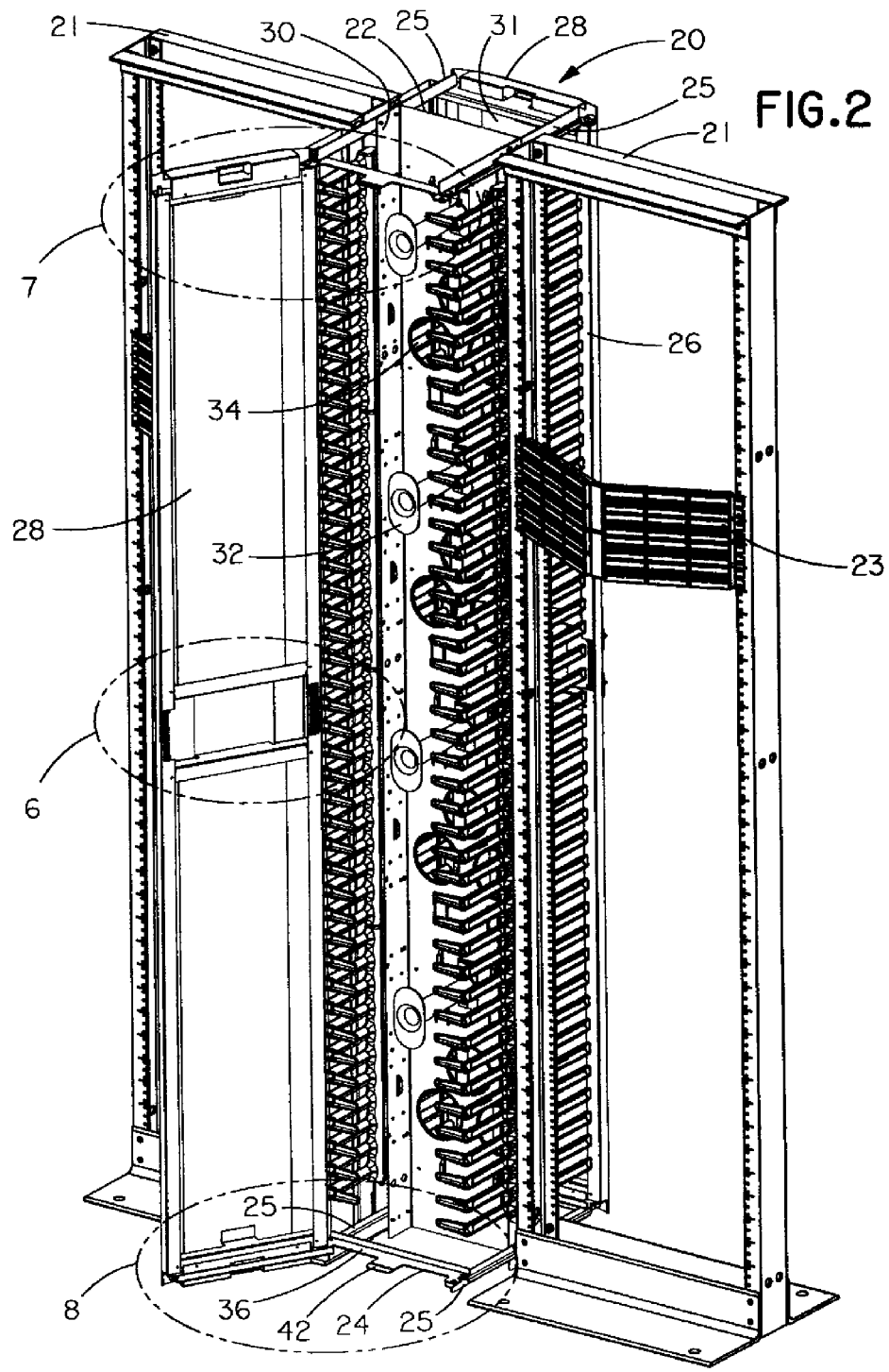
FIG. 2 is a front right perspective view of the vertical cable manager of FIG. 1, showing the hinged door in an open position.

Vertical cable manager 20 includes a backbone 22, a plurality of cross braces such as cross brace 24 connected to a plurality of horizontal rails such as horizontal rail 25, a plurality of finger sections such as finger section 26 connected to backbone 22 and two hinged doors such as hinged door 28 connected to cross braces 24, which collectively define a front vertical cable channel 30 and a rear vertical cable channel 31. As shown in FIGS. 1 and 2, vertical cable manager 20 includes four cross braces 24, sixteen finger sections 26 and two hinged doors 28 for front and rear cable management. Vertical cable manager 20 would include only two cross braces 24, eight finger sections 26 and one hinged door 28 for front cable management.

Figure 3:
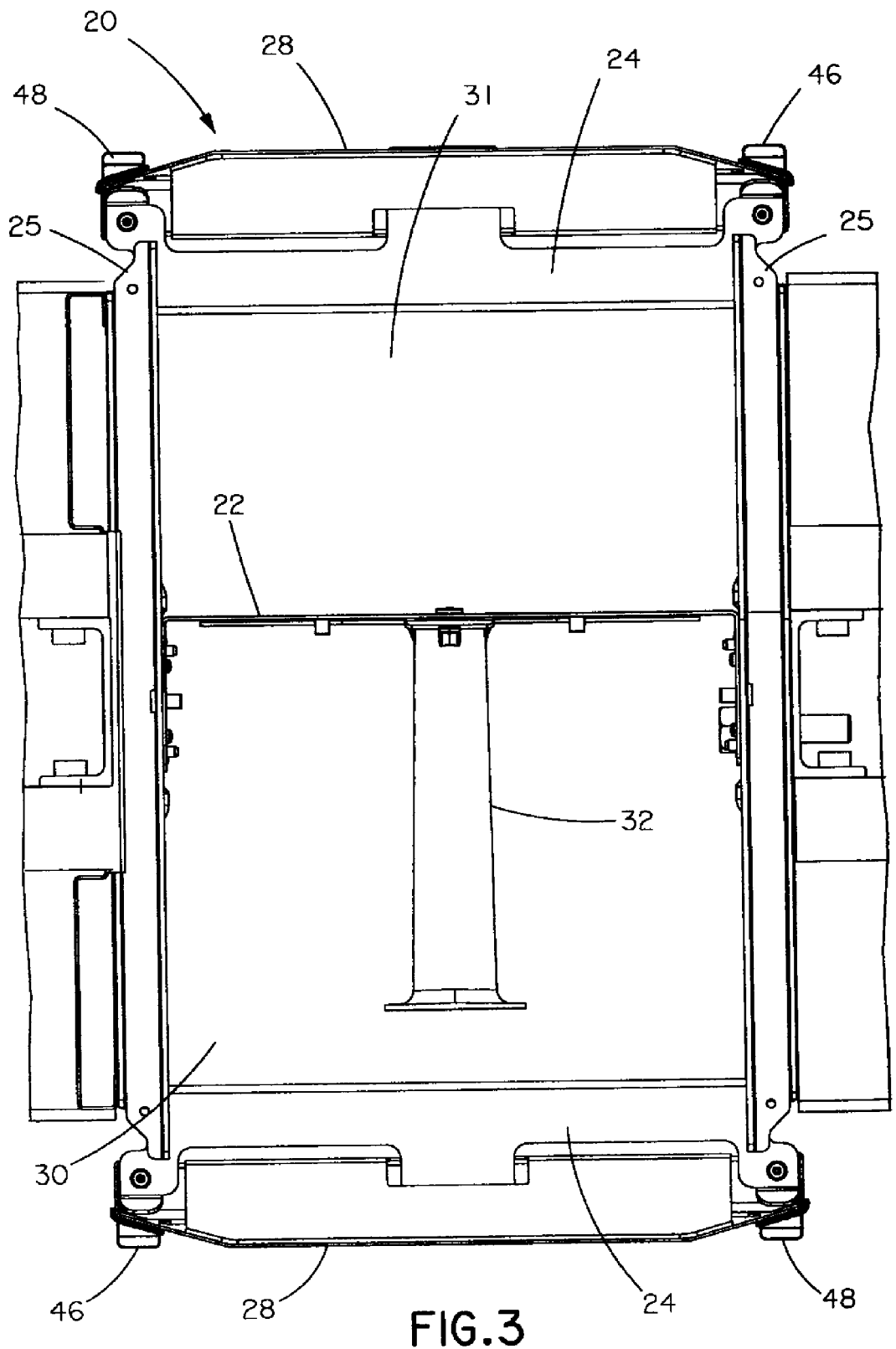
FIG. 3 is an enlarged top view of the vertical cable manager of FIG. 1.
Figure 4:
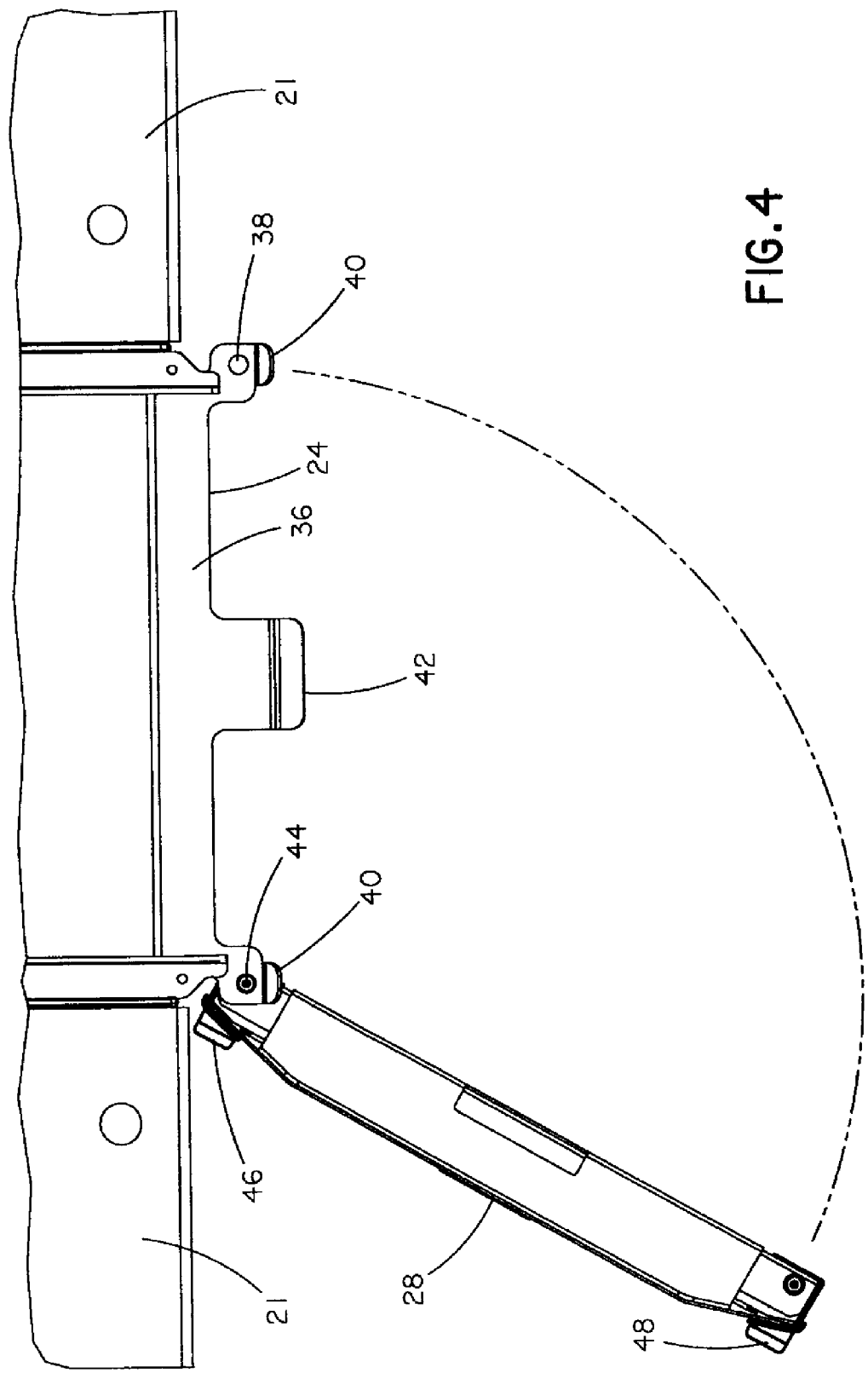
FIG. 4 is a partial enlarged top view of the vertical cable manager of FIG. 2.
Figure 5:
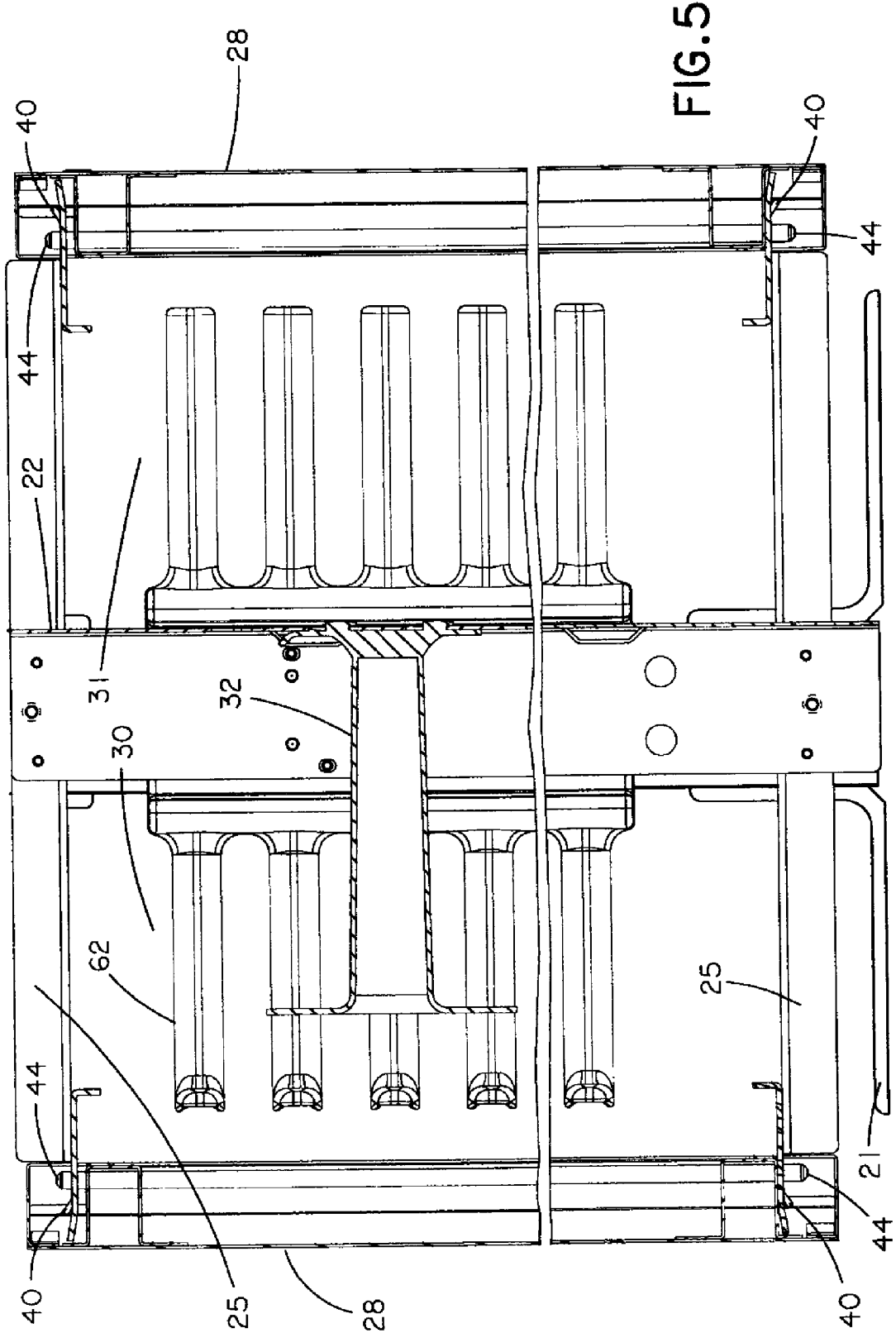
FIG. 5 is a cross-sectional view taken along lines 5-5 of FIG. 1.

FIGS. 1 and 5 show doors 28 in a closed position, while FIGS. 2 and 4 show front door 28 in an open position. As can be seen in FIG. 2, backbone 22 extends the entire height of vertical cable manager 20. Although FIG. 3 shows backbone 22 configured to provide greater front cable capacity, backbone 22 may be configured to provide equal front and rear cable capacity. Similarly, backbone 22 may be configured to provide greater rear cable capacity.

Backbone 22 includes multiple groups of slots for receiving four slack spools 32. Preferably, slack spools 32 are plastic and snap onto backbone 22. Although FIG. 2 shows four slack spools 32 equidistantly-spaced along the height of vertical cable manager 20, slack spools 32 may be removed and repositioned to accommodate a variety of slack cable lengths. Moreover, backbone 22 includes a plurality of pass through openings 34 having rolled edges 35, which are formed using a special rollover tool that provides cable protection without the need for a separate plastic or rubber piece. Preferably, backbone 22 includes twelve pass through openings 34, as best seen in FIG. 2.

Figure 7:
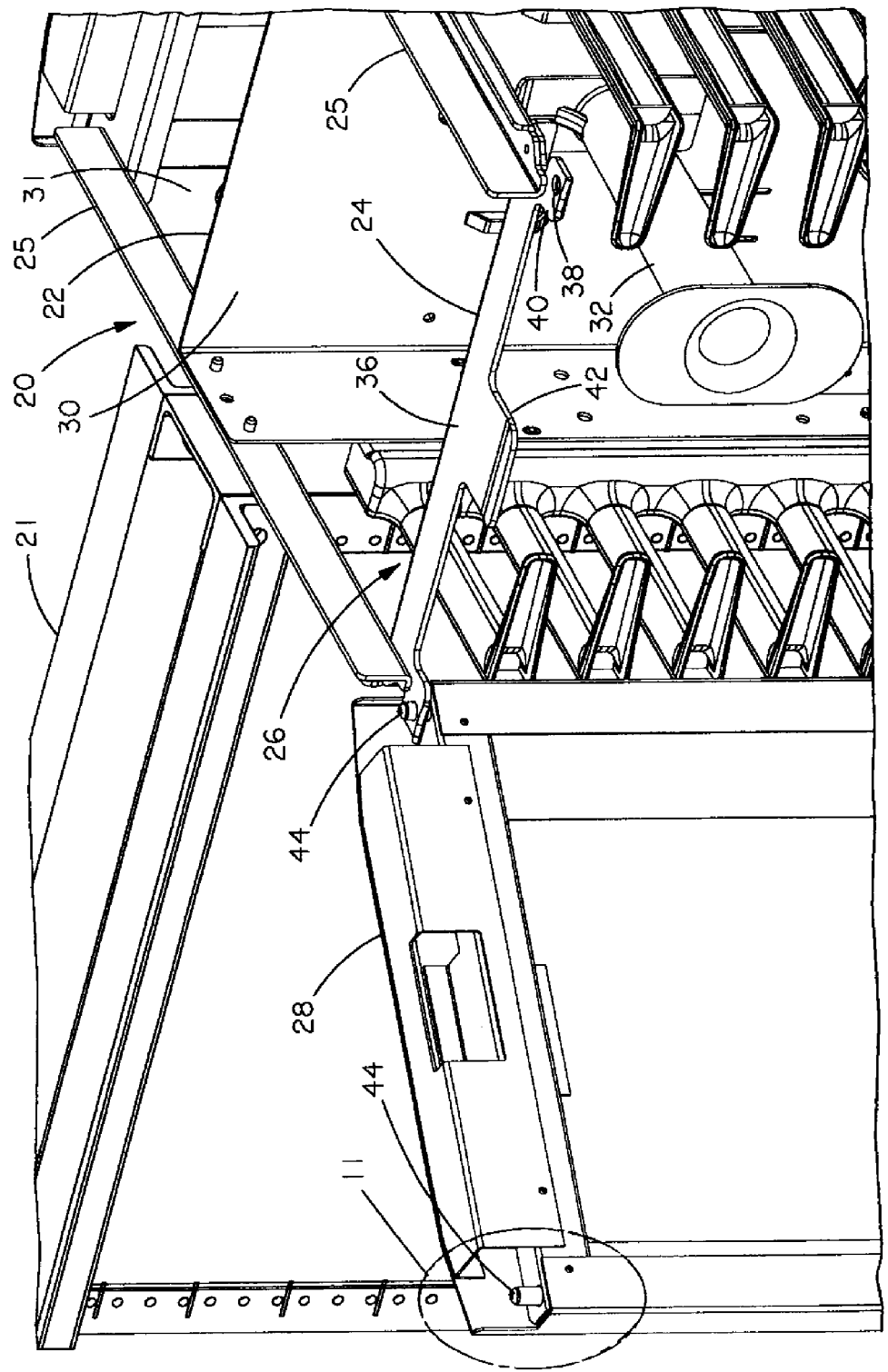
FIG. 7 is an enlarged view of a top section of the hinged door of FIG. 2, showing the hinged door in an open position.
Figure 8:
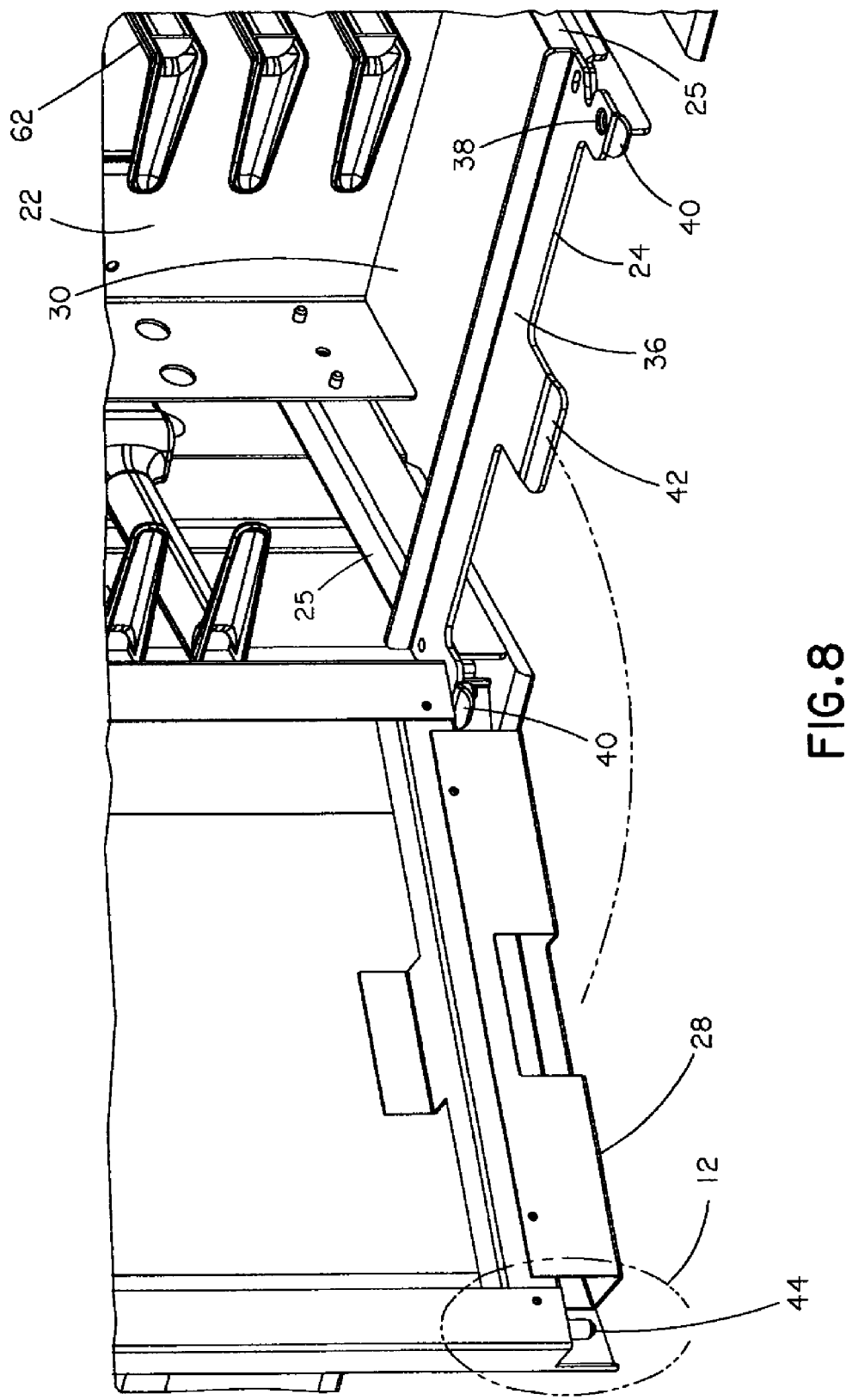
FIG. 8 is an enlarged view of a bottom section of the hinged door of FIG. 2, showing the hinged door in an open position.

As shown in FIGS. 7 and 8, cross brace 24 includes a mounting surface 36 having hinge pin holes 38, guide surfaces 40 and a door alignment or closure aid 42. Hinge pin holes 38 are integrated into cross brace 24 to ensure pin alignment during door actuation. Due to the door weight and clearance between hinge pin 44 and hinge pin hole 38, gravity may cause the released side of door 28 to drop below mounting surface 36 of cross brace 24 and cause door 28 to bang on the abrupt guide surface 40 of hinge pin hole 38 upon closure. As best seen in FIG. 4, door alignment or closure aid 42 protrudes beyond a horizontal axis extending between guide surfaces 40. Door alignment or closure aid 42 takes advantage of the additional space in the middle of door 28 to provide a more gradual lead-in, helping to lift door 28 before door 28 abruptly contacts guide surface 40 of hinge pin hole 38. Thus, door alignment or closure aid 42 assists the alignment and engagement of hinge pin 44 into hinge pin hole 38 in cross brace 24.

Figure 6:
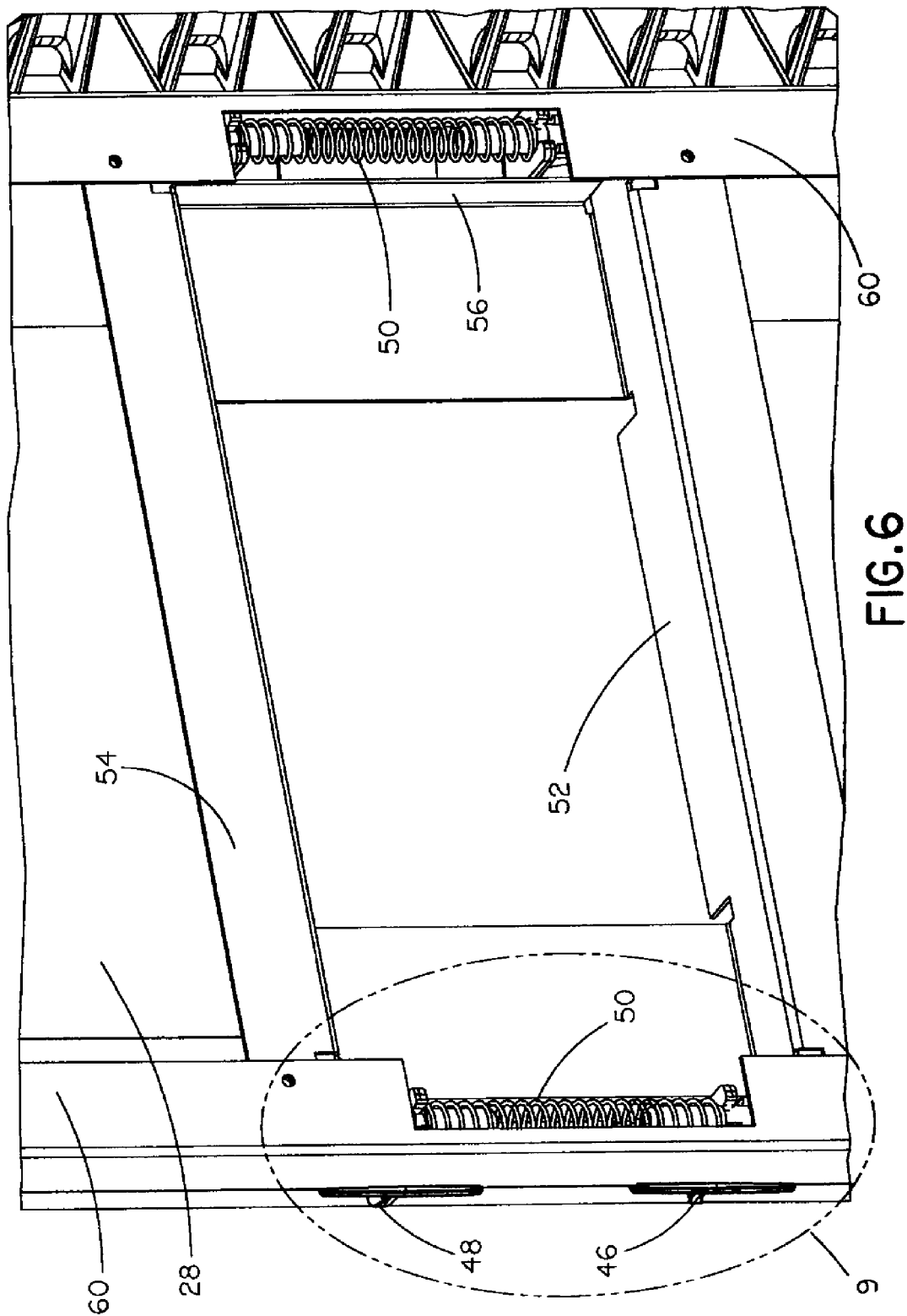
FIG. 6 is an enlarged view of a center section of the hinged door of FIG. 2.
Figure 9:
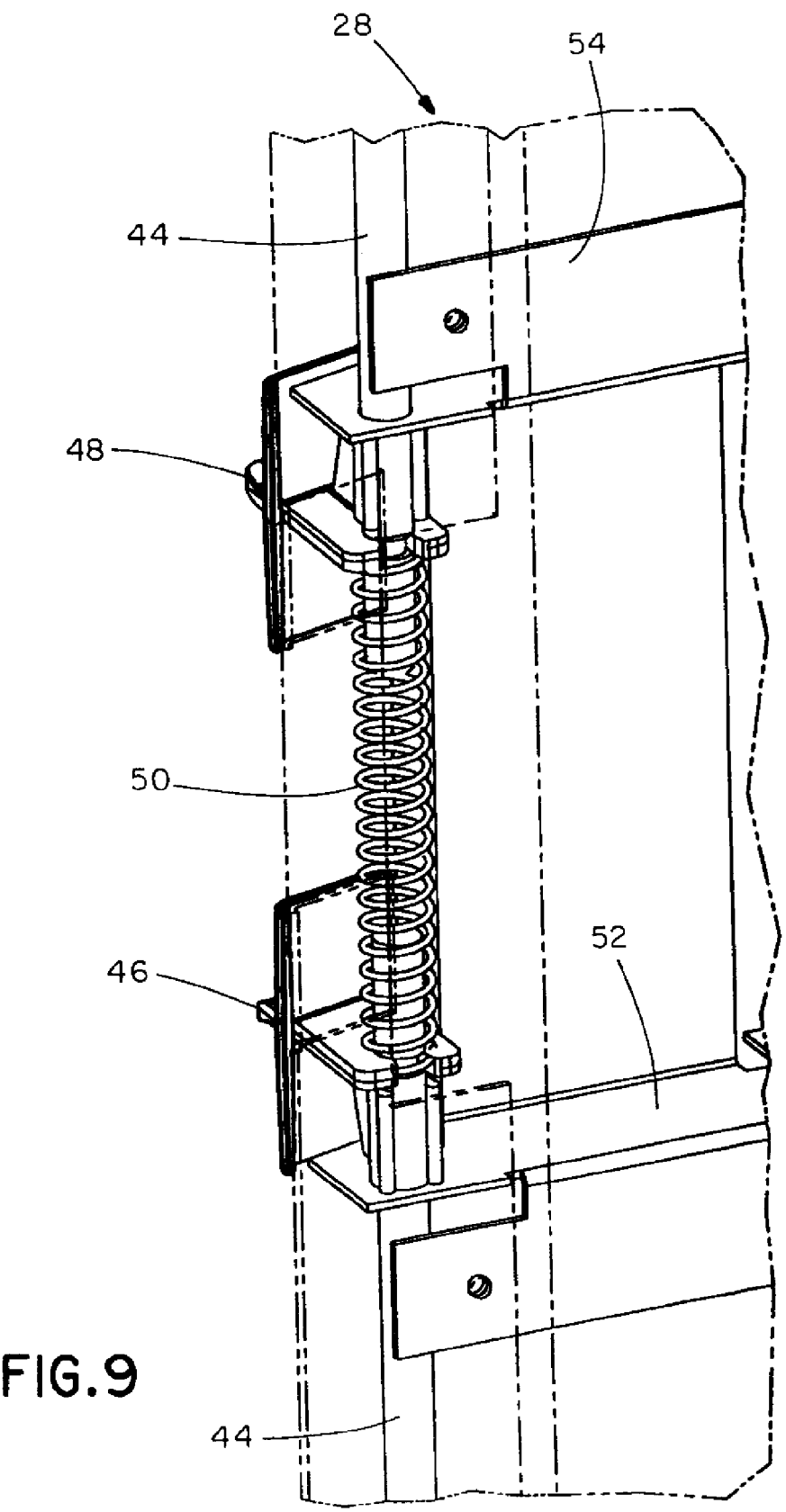
FIG. 9 is an enlarged view of a center section of the hinged door of FIG. 6.
Figure 10:
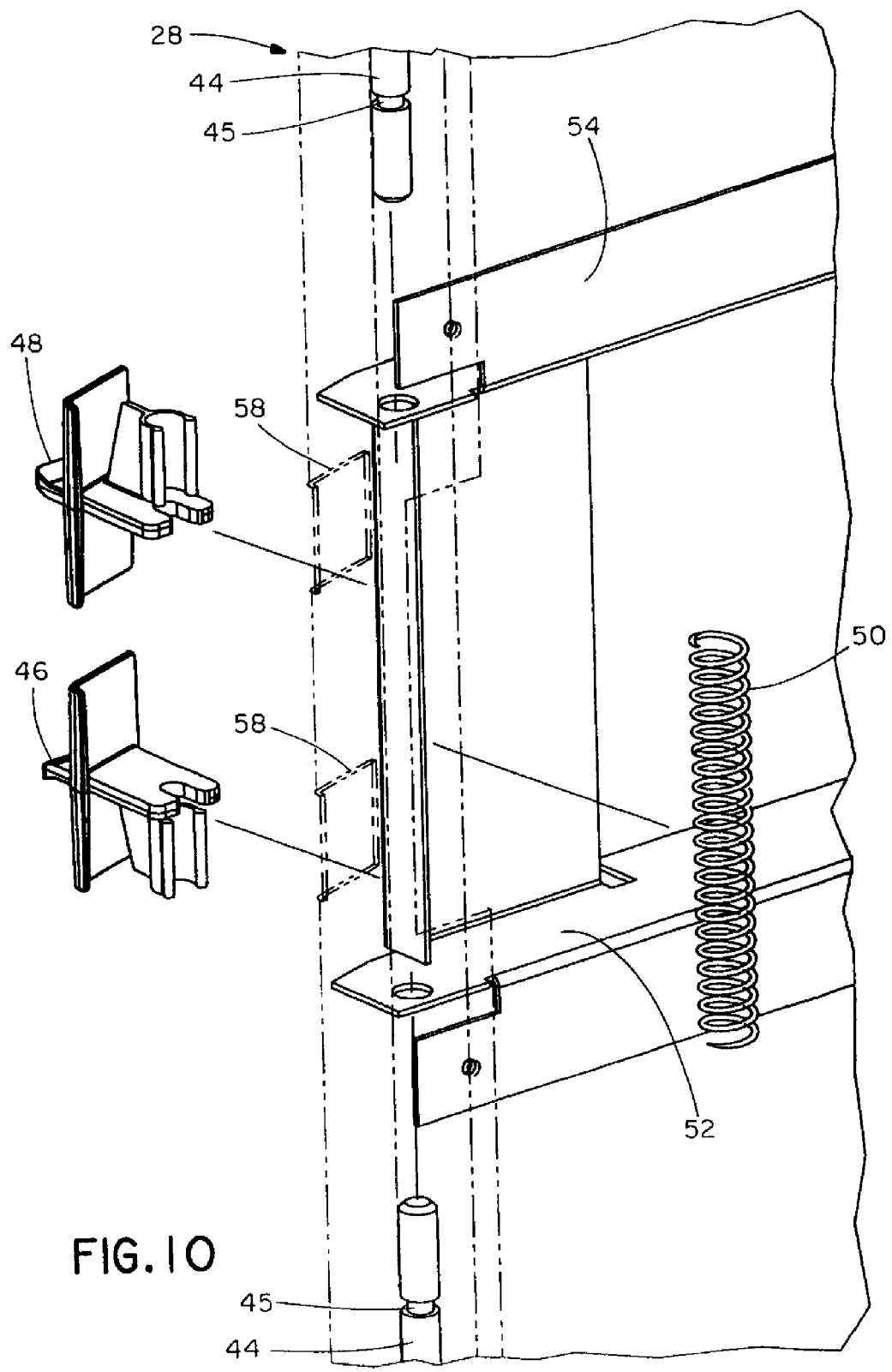
FIG. 10 is an exploded view of the hinged door of FIG. 9.
Figure 15:
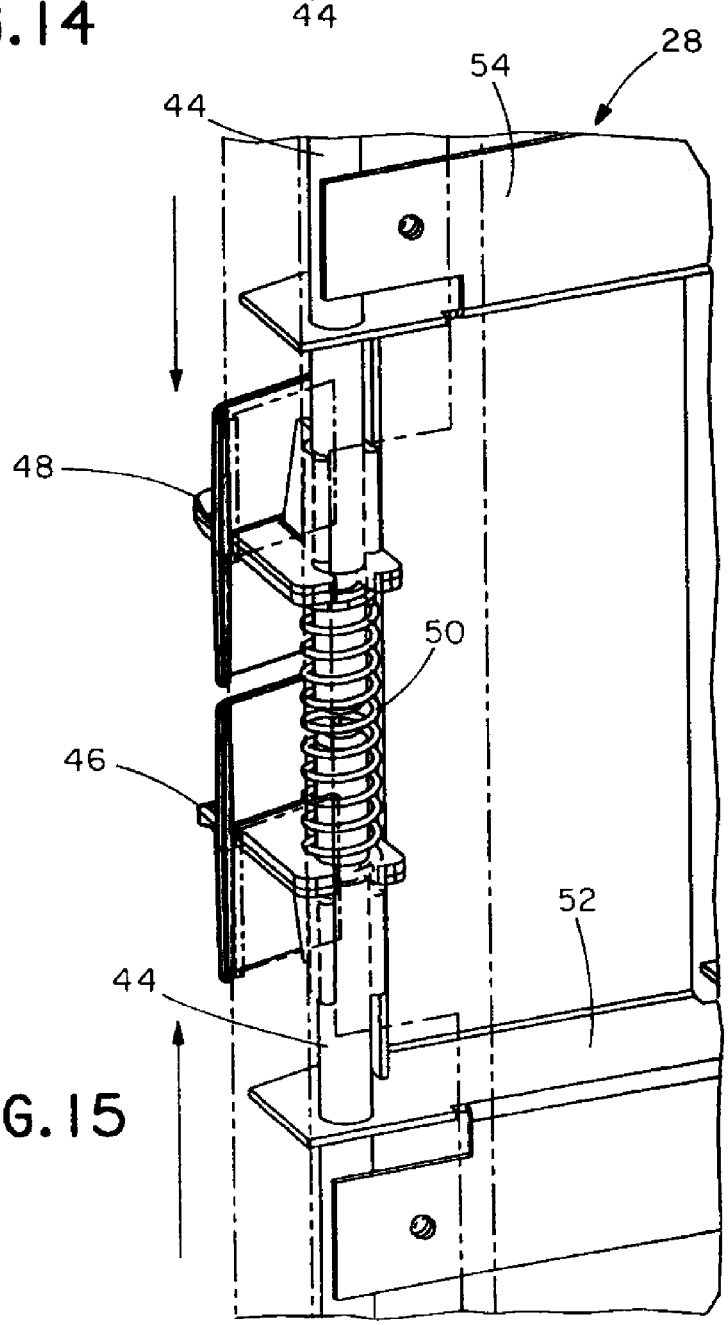
FIG. 15 is an enlarged view of the center section of the hinged door similar to FIG. 9, showing actuation of the door latches.
Figure 16:
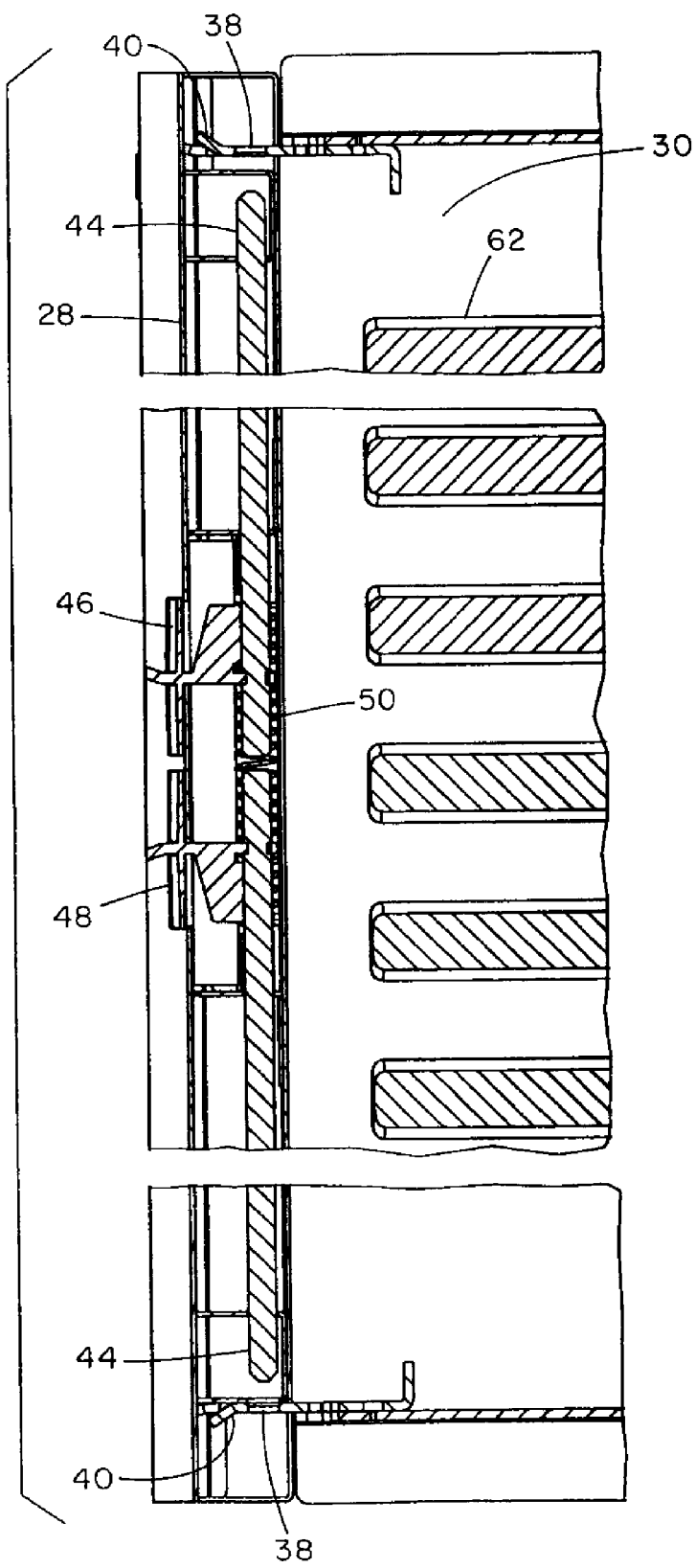
FIG. 16 is a cross-sectional view similar to FIG. 13, showing the hinged door in an open position.

FIG. 1 shows two sets of door latches 46, 48 utilized in door 28. One latch from each set of latches 46, 48 may be squeezed together to actuate door 28 as shown in FIGS. 15 and 16, thus allowing door 28 to hinge in either direction. Although FIG. 2 shows door 28 opening to the left, it is likewise contemplated that door 28 may open to the right. FIGS. 9 and 10 show return spring 50 utilized in door 28, with door skin 60 (see FIG. 6) removed for clarity. Window 58 in door skin 60 provides the necessary clearance for latches 46, 48 to slide during door actuation. As latches 46, 48 are pushed together, return spring 50 is compressed while hinge pin 44 is released from hinge pin holes 38 as shown in FIG. 16, allowing door 28 to swing open. Latch stop surface 52 of spring support door bracket 54 provides support for latches 46, 48 when door 28 is closed, as best seen in FIG. 6.

Figure 11:
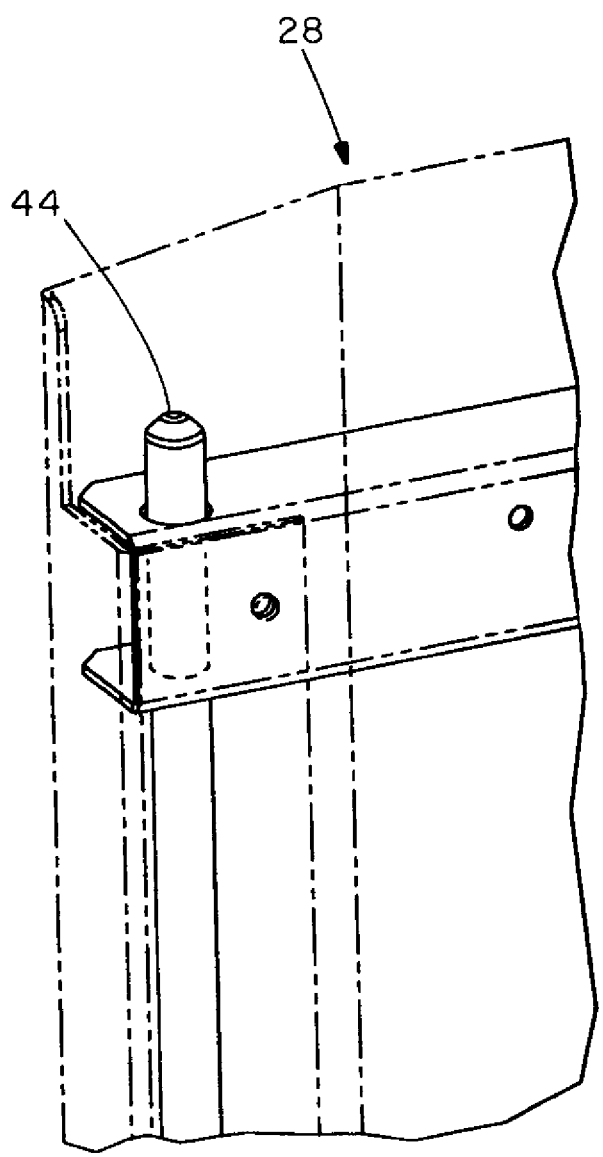
FIG. 11 is an enlarged view of the top section of the hinged door of FIG. 7.
Figure 12:
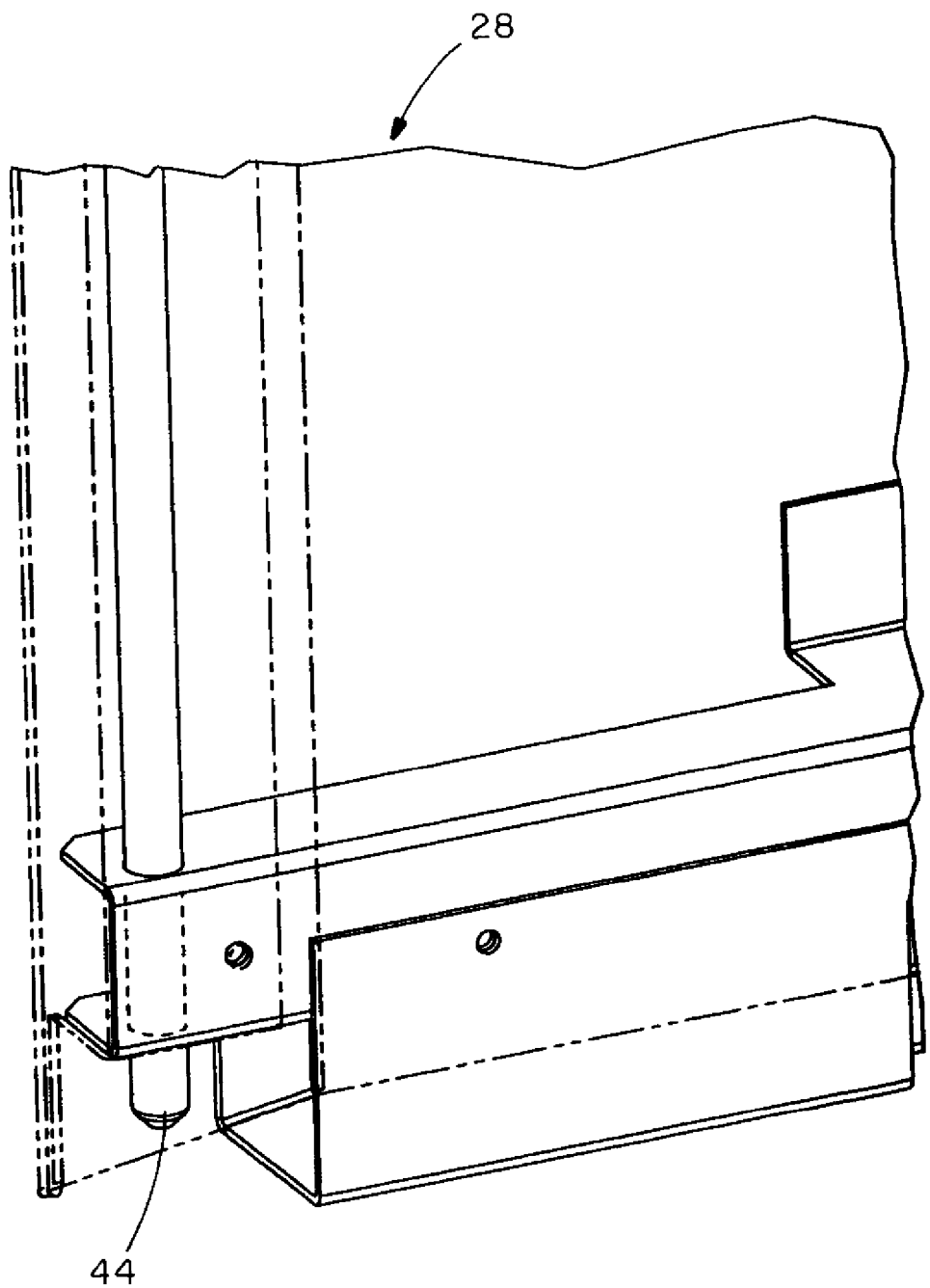
FIG. 12 is an enlarged view of the bottom section of the hinged door of FIG. 8.
Figure 13:
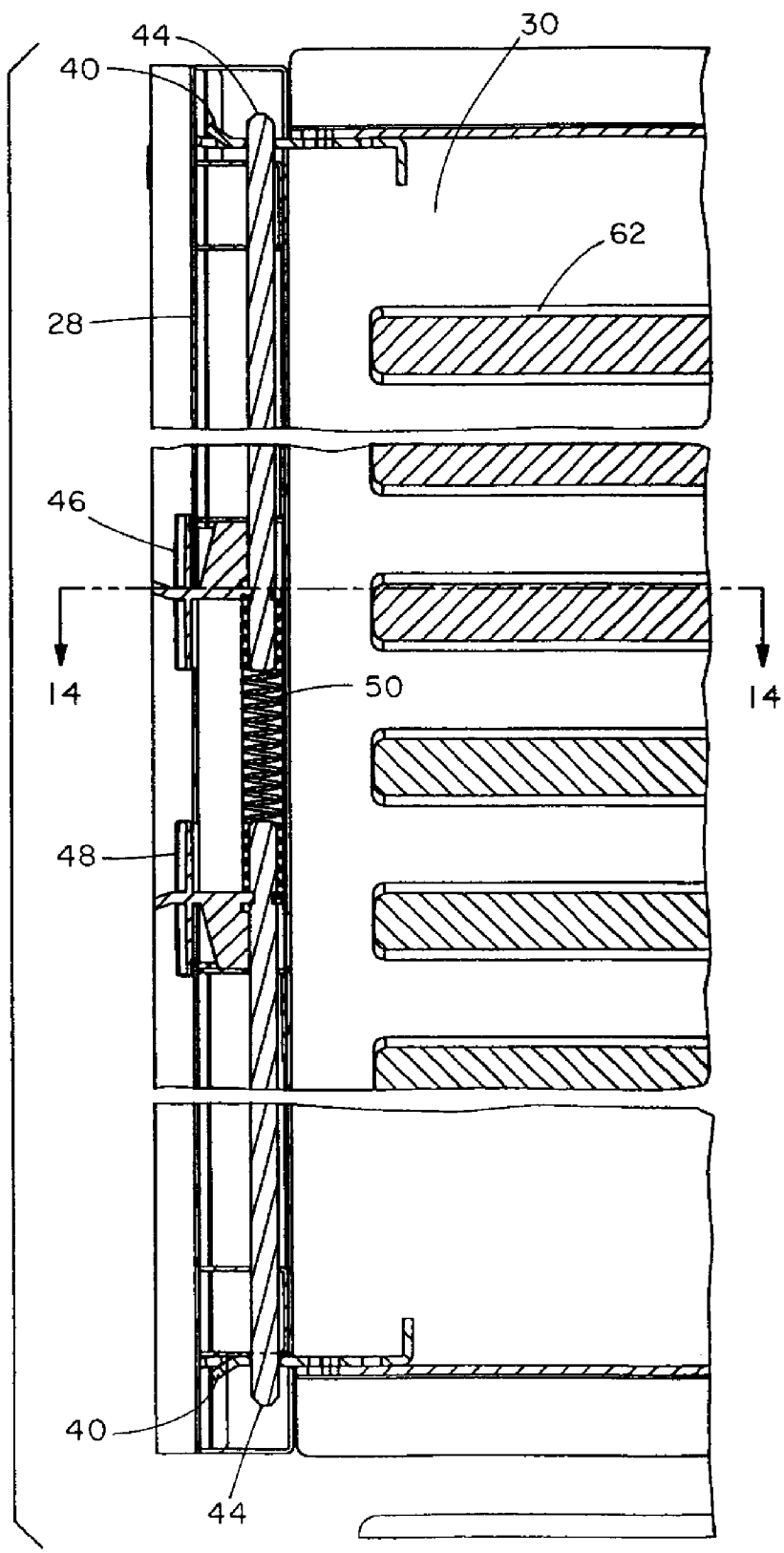
FIG. 13 is a cross-sectional view taken along lines 13-13 of FIG. 1, showing the hinged door in a closed position.
Figure 14:
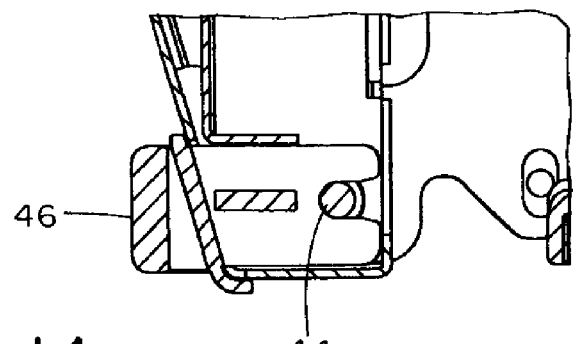
FIG. 14 is a cross-sectional view taken along lines 14-14 of FIG. 13.

FIG. 10 shows an exploded view of the components of the door latch mechanism. In order to assemble the door latch mechanism, hinge pins 44 are inserted through hinge pin holes 38 until grooves 45 are aligned with latches 46, 48, and then latches 46, 48 are snapped onto hinge pins 44. Return spring 50 is inserted over one end of hinge pin 44, compressed, and then inserted onto the other end of hinge pin 44. FIGS. 11 and 12 illustrate hinge pins 44 positioned within hinge pin holes 38 on the top and bottom of door 28, respectively, and FIGS. 7 and 8 illustrate the top and bottom of door 28 connected to cross braces 24. Moreover, FIGS. 13 and 14 show door 28 in a closed position; whereas, FIG. 16 shows door 28 in an open position.

Figure 17:
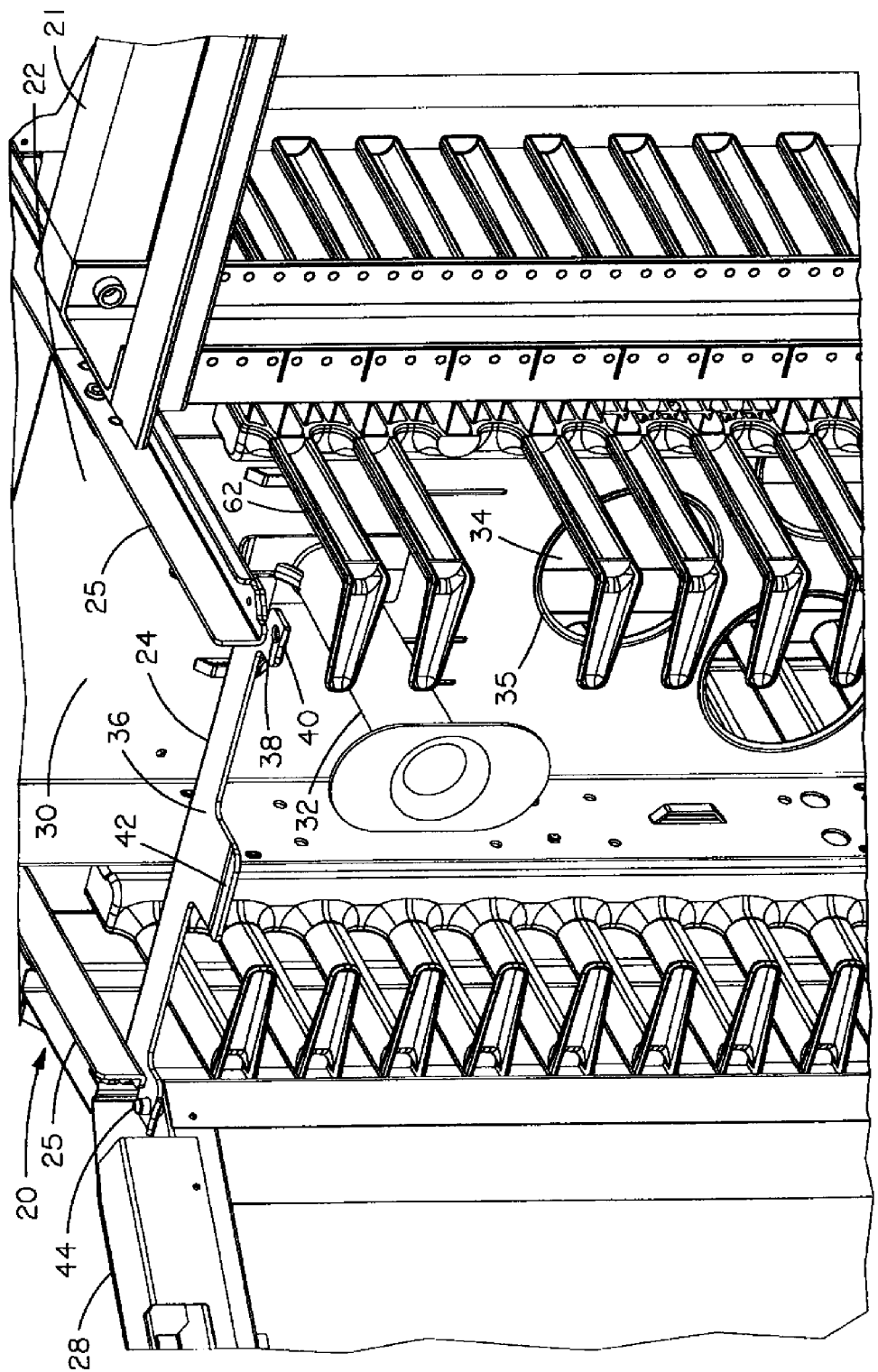
FIG. 17 is an enlarged view of a top section of the vertical cable manager of FIG. 2, showing a finger removed from a finger section.
Figure 18:
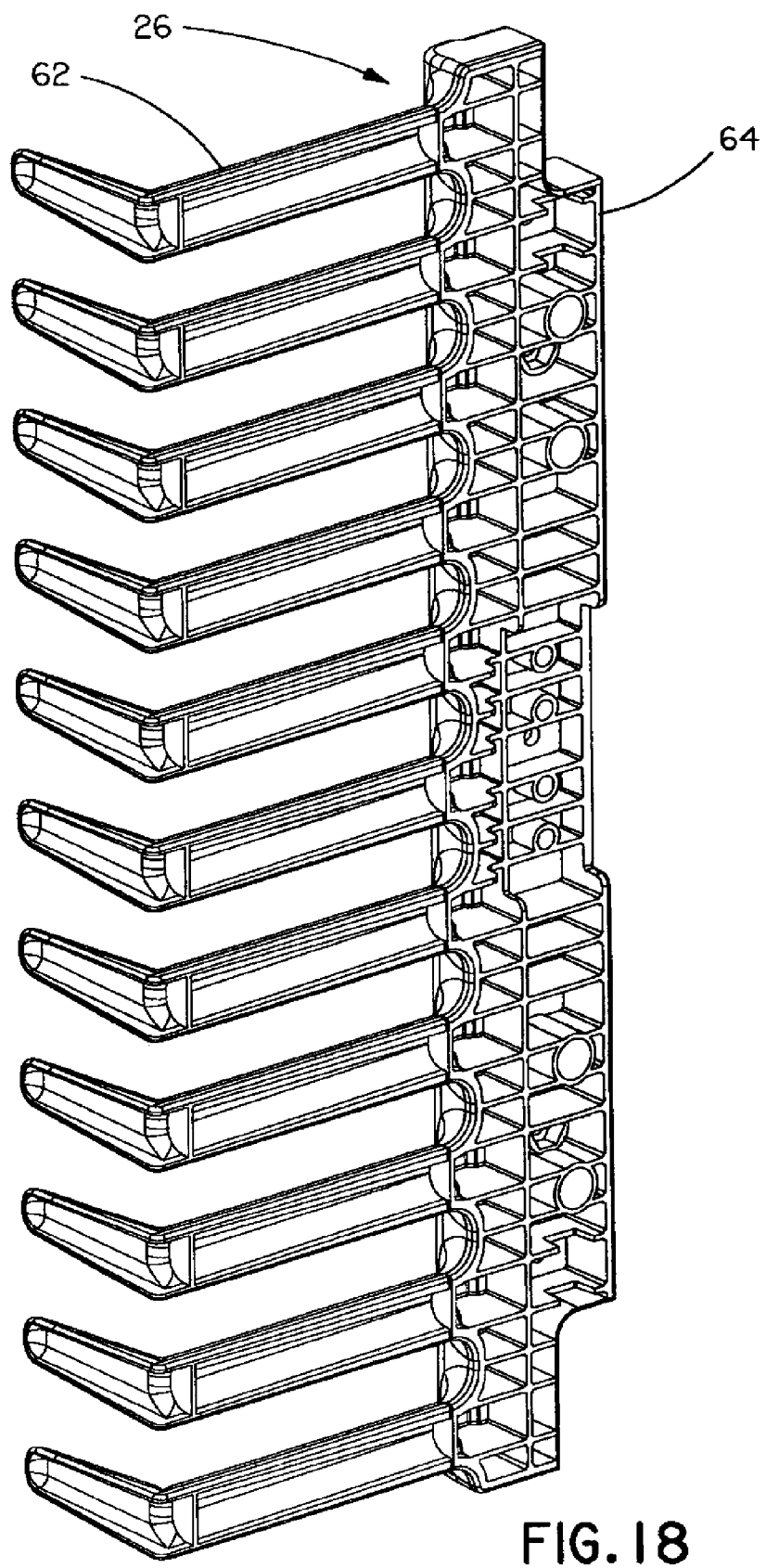
FIG. 18 is an enlarged perspective view of a finger section of the vertical cable manager of FIG. 1.

FIG. 17 shows a finger removed from finger section 26 shown in FIG. 18. Preferably, vertical cable manager 20 includes four fingers sections 26 on each side of front vertical cable channel 30, and four finger sections on each side of rear vertical cable channel 31. As best seen in FIG. 18, each finger section 26 includes eleven fingers 62 and occupies eleven rack units. Rack 21 shown in FIGS. 1 and 2 has forty-five rack units. Thus, four finger sections 26 occupy forty-four out of forty-five rack units. Although finger sections 26 are shown in FIGS. 1 and 2 providing cable management to the top rack unit, it is likewise contemplated that finger sections 26 may be configured to provide cable management to the bottom rack unit.

Figure 19A:
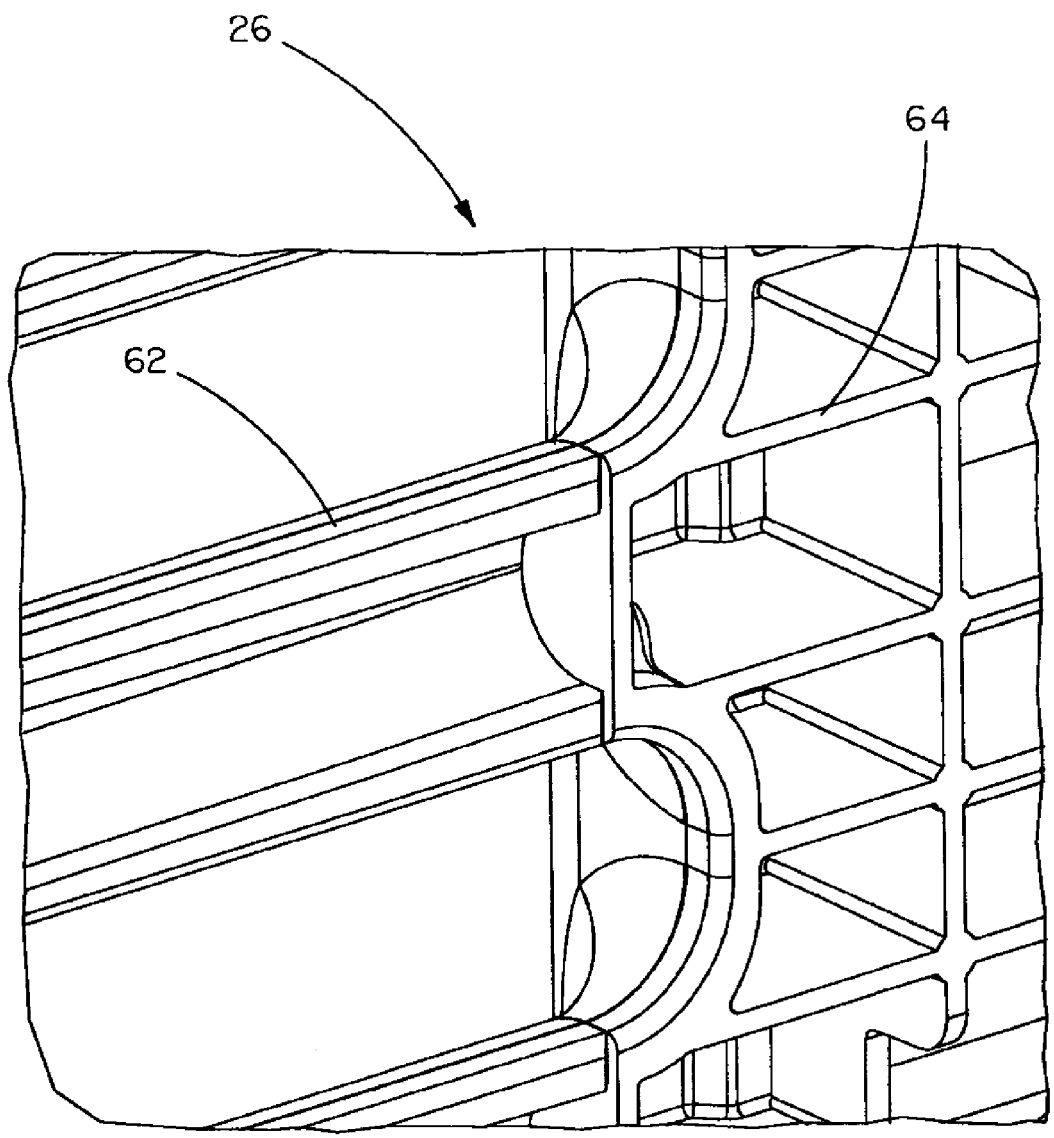
FIG. 19A is an enlarged view of a portion of the finger section of FIG. 18.

FIGS. 19A and 19B show an enlarged view of fingers 62 and base 64. Score grooves help create stress risers in fingers 62 when a breakaway load is applied. As shown in FIG. 19B, score grooves allow fingers 62 to be removed from base 64 without the use of a tool, for the purpose of creating horizontal pathways in any EIA network equipment rack. The force required to breakaway fingers 62 from base 64 can be tuned by adjusting the score groove geometry.

The disclosed invention provides a vertical cable manager having a spring-loaded, center release door latch mechanism and a door alignment or closure aid. It should be noted that the above-described illustrative embodiments and preferred embodiments of the invention are not an exhaustive listing of the form such a vertical cable manager in accordance with the invention might take; rather, they serve as an exemplary and illustrative of embodiments of the invention as presently understood. Many other forms of the invention are believed to exist.

The invention claimed is:

1. A bracket mounting a door to a vertical cable manager, the door comprising a first hinge pin and a second hinge pin, the first hinge pin defining a first axis of rotation and the second hinge pin defining a second axis of rotation, the bracket comprising:
   a pair of horizontal rails; and
   a cross brace connected to the horizontal rails, the cross brace comprising:
      a first mounting surface comprising a first opening for receiving the first hinge pin in a first direction parallel to the first axis of rotation and a second mounting surface comprising a second opening for receiving the second hinge pin in a second direction parallel to the second axis of rotation;
      a first guide surface extending from the first mounting surface, the first guide surface oblique relative to the first mounting surface, and a second guide surface extending from the second mounting surface, the second guide surface oblique relative to the second mounting surface; and an alignment surface spaced equidistantly between the first opening and the second opening and extending beyond a horizontal axis defined by distal ends of the first guide surface and the second guide surface, the alignment surface engaging a recessed portion of the door.

2. A bracket mounting a door to a vertical cable manager, the door comprising a first hinge pin and a second hinge pin, the first hinge pin defining a first axis of rotation and the second hinge pin defining a second axis of rotation, the bracket comprising:

a first mounting surface comprising a first opening for receiving the first hinge pin in a first direction parallel to the first axis of rotation and a second mounting surface comprising a second opening for receiving the second hinge pin in a second direction parallel to the second axis of rotation;

a first guide surface extending from the first mounting surface, the first guide surface oblique relative to the first mounting surface, and a second guide surface extending from the second mounting surface, the second guide surface oblique relative to the second mounting surface; and an alignment surface spaced equidistantly between the first opening and the second opening and extending beyond a horizontal axis defined by distal ends of the first guide surface and the second guide surface, the alignment surface engaging a recessed portion of the door.

3. The bracket of claim 1, wherein the first guide surface is spaced apart from the first opening and the second guide surface is spaced apart from the second opening.

4. The bracket of claim 1, wherein the alignment surface engages the door when the door is closed.

5. The bracket of claim 2, wherein the first guide surface is spaced apart from the first opening and the second guide surface is spaced apart from the second opening.

6. The bracket of claim 2, wherein the alignment surface engages the door when the door is closed.

* * * * *